(12) United States Patent
Kislovsky et al.

(10) Patent No.: US 7,028,882 B2
(45) Date of Patent: Apr. 18, 2006

(54) PROCESS AND APPARATUS FOR BOILER TUBE PANEL WELDING AND STRAIGHTENING

(75) Inventors: Victor Kislovsky, Overland Park, KS (US); Warren T. Moss, Archie, MO (US); Richard Wayne Rohaus, Lawson, MO (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 10/708,006

(22) Filed: Feb. 2, 2004

(65) Prior Publication Data

US 2005/0167468 A1    Aug. 4, 2005

(51) Int. Cl.
*B23K 31/02*    (2006.01)
(52) U.S. Cl. .................. 228/256; 219/59.1; 219/60 R; 219/61; 29/890.054
(58) Field of Classification Search ........... 29/890.031, 29/890.038, 890.054; 219/59.1, 61, 60 R, 219/79.1, 76.12, 76.11, 76.14; 228/119, 228/184, 256
See application file for complete search history.

(56) References Cited

U.S. PATENT DOCUMENTS

| 5,014,901 A | | 5/1991 | Moran .................... 228/119 |
| 6,013,890 A | * | 1/2000 | Hulsizer ................. 219/76.14 |
| 6,175,093 B1 | * | 1/2001 | Cauthon et al. .......... 219/76.14 |
| 6,548,783 B1 | * | 4/2003 | Kilovsky et al. ......... 219/125.1 |
| 2002/0139234 A1 | | 10/2002 | Inouye et al. ........... 219/121.64 |
| 2003/0234241 A1 | | 12/2003 | Harth, III ............... 219/121.64 |

* cited by examiner

*Primary Examiner*—Kevin Kerns
*Assistant Examiner*—Michael Aboagye
(74) *Attorney, Agent, or Firm*—Ernest Cusick; Gary M. Hartman; Domenica N. S. Hartman

(57) ABSTRACT

An apparatus and process for depositing an overlay weld on a boiler tube panel comprising a plurality of tubes with adjacent tubes joined together with membranes therebetween, and then straightening the panel in response to bowing that occurs as a result of depositing the overlay weld. The apparatus generally comprises an overlay welding apparatus that deposits an overlay weld on a surface of a boiler tube panel, and a straightening apparatus for straightening the panel following deposition of the overlay weld. The straightening process entails placing the boiler tube panel between two members, and the pressing a portion of the panel therebetween.

25 Claims, 5 Drawing Sheets

PROCESS AND APPARATUS FOR BOILER TUBE PANEL WELDING AND STRAIGHTENING

BACKGROUND OF INVENTION

1. Field of the Invention

The present invention generally relates to welding equipment and processes. More particularly, this invention relates to a welding apparatus and process for depositing an overlay weld on a boiler tube panel and then straightening the panel for installation in a boiler.

2. Description of the Related Art

Overlay welding generally involves depositing weld material over a surface region in a series of beads with some lateral overlapping, forming a continuous layer of weld material that increases the thickness and strength of the region. Overlay welds are often deposited by shielded metal-arc welding (including gas metal arc welding (GMAW) and gas tungsten arc welding (GTAW)) in the restoration of tubes and large vessels used in industries such as utilities, co-generation refining, petrochemical, pulp and paper, and waste-to-energy. Particular uses of overlay welds include reinforcing and repairing individual boiler tubes, nozzles, and pipe sections of a boiler and the reinforcement and repair of boiler tube panels comprising a number of boiler tubes joined by web or membrane bars. Boiler tubes and tube panels reinforced or repaired with a corrosion-resistant overlay weld offer much longer tube life, reducing costly unscheduled maintenance outages and significantly improving boiler availability.

The reinforcement and repair of boiler tube panels have been performed manually or with the use of an automatic or semiautomatic welding machine. Accuracy and consistency of all parameters are critical during an overlay welding process, especially when the panel must be both supported and manipulated during welding, as is the case with overlay welding operations performed on boiler tube panels prior to installation in a boiler. Further complicating the overlay process is the need to comply with a wide range of specifications, such as minimal weld penetration and deposit thickness, low dilution, complete fusion, homogeneous deposits, and very low heat input.

Distortion has been a particular problem encountered when overlay welding boiler tube panels prior to installation as a result of the large size of tube panels (for example, about fifty feet (about fifteen meters) in length and about six feet (about two meters) in width) and the relatively large heat input of GMAW and GTAW welding process. Distortion in the form of bowing or bending of a panel is particularly likely when welding is performed on only one side of the panel, e.g., the side that will face the interior of the boiler and therefore most likely to be deteriorated from corrosion. As a solution, complex fixtures have been proposed as well as welding techniques that reduce the amount of heating. It would be desirable if an overlay welding apparatus and process were available that were sufficiently uncomplicated for use by operators with limited experience, yet capable of consistently producing undistorted boiler tube panels.

SUMMARY OF INVENTION

The present invention provides an apparatus and process for depositing an overlay weld on a boiler tube panel comprising a plurality of tubes with adjacent tubes joined together with membranes therebetween, and then straightening the panel in response to bowing that occurs as a result of depositing the overlay weld. The apparatus generally comprises means for supporting the boiler tube panel during overlay welding, and means for straightening the boiler tube panel following deposition of the overlay weld. The supporting means comprises a frame adapted to support the boiler tube panel by contacting a first surface thereof, at least one welding carriage mounted adjacent the frame and adapted for travel along the frame, and an overlay welding head mounted to the welding carriage and adapted for depositing an overlay weld on a second surface of the boiler tube panel oppositely disposed from the first surface of the boiler tube panel. The straightening means comprises a first member having a contact surface with a profile that is complementary to the first surface of the boiler tube panel, a second member having a contact surface with a profile that is complementary to the second surface of the boiler tube panel, means for causing the first and second members to move toward each other to press a portion of the boiler tube panel therebetween and for causing the first and second members to move away from each other to release the boiler tube panel, and means for positioning the boiler tube panel between the first and second members.

The process carried out with the above-described apparatus generally entails supporting the boiler tube panel on the frame so that the frame contacts the first surface of the boiler tube panel, overlay welding the second surface of the boiler tube plate with at least one overlay welding head supported by a welding carriage that travels along the frame, positioning the welded boiler tube panel between the first and second members, and then straightening the boiler tube panel by moving the first and second members toward each other so that the first and second surfaces of the boiler tube panel are contacted with contact surfaces of the first and second members, respectively, so that a portion of the boiler tube panel is pressed therebetween. The first and second members are then moved away from each other to release the boiler tube panel.

According to optional but preferred aspects of the invention, the apparatus includes electronic circuitry that provides better control of the overlay welding head and various parameters of the overlay welding operation. For example, the apparatus preferably includes a feedback capability that can address errors and failures of various components of the welding apparatus, including shielding gas, carriage travel, etc., thereby reducing the incidence of cold laps, burn-throughs, and overlay deposited with improper shielding gas pressure. The invention utilizes the above improvements and preferred aspects to provide an apparatus and process that are capable of consistently producing an undistorted boiler tube panel, yet the apparatus and process are sufficiently uncomplicated to be used by operators with limited experience.

Other objects and advantages of this invention will be better appreciated from the following detailed description.

DETAILED DESCRIPTION

Figure 1:
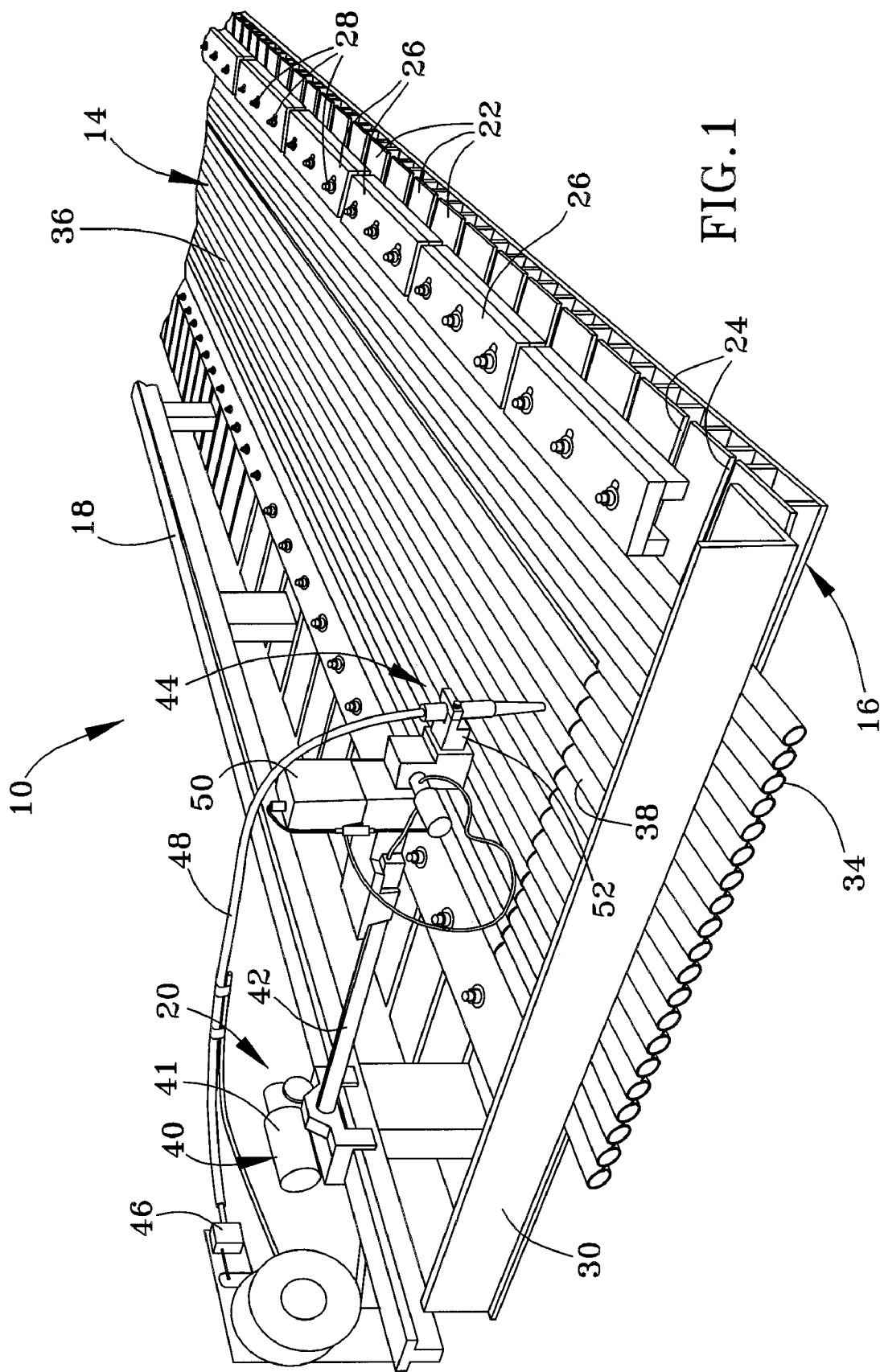
FIGS. 1 and 2 are perspective views of opposite ends of an overlay welding apparatus in accordance with a preferred embodiment of the present invention.
Figure 2:
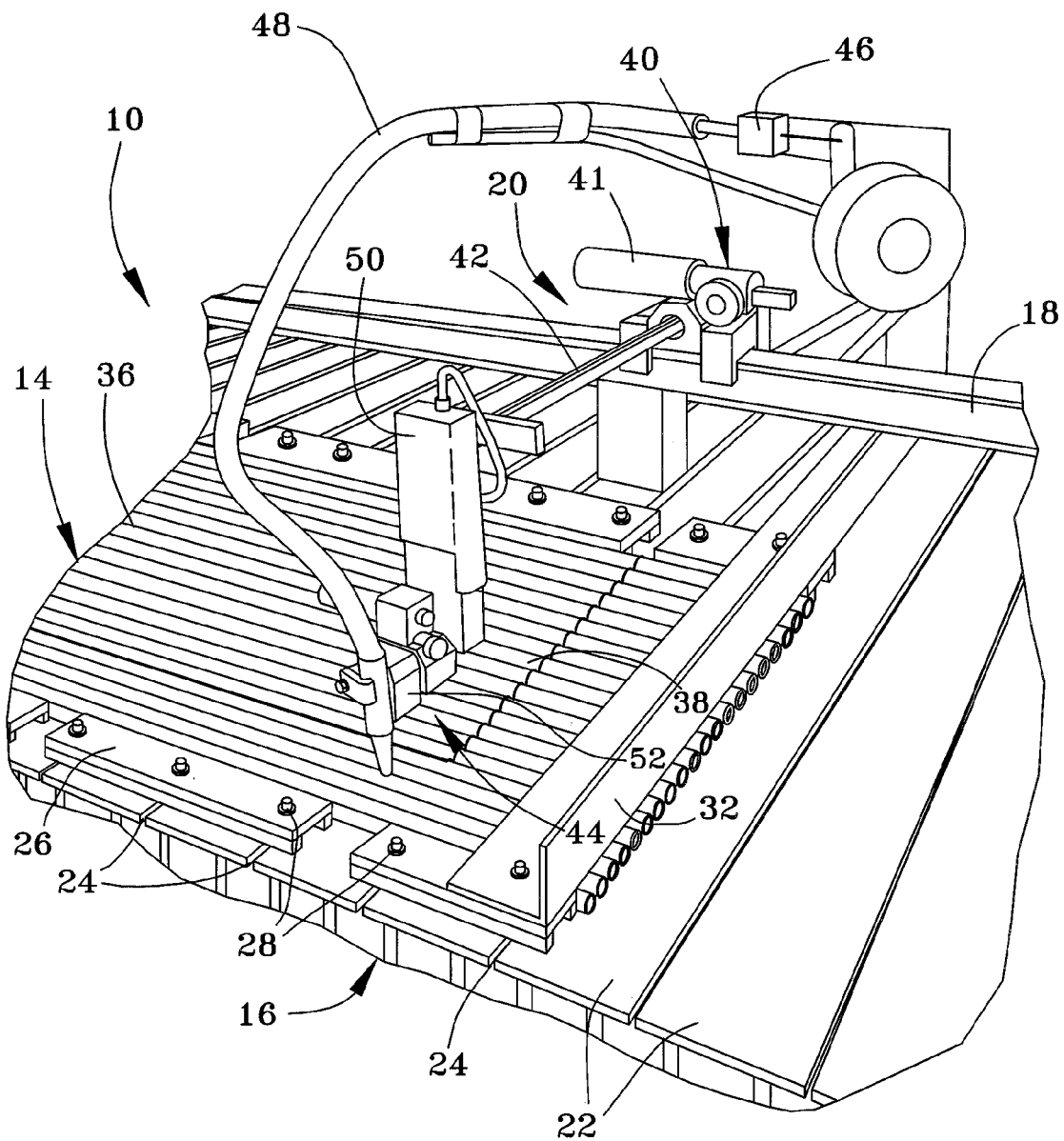
Figure 5:
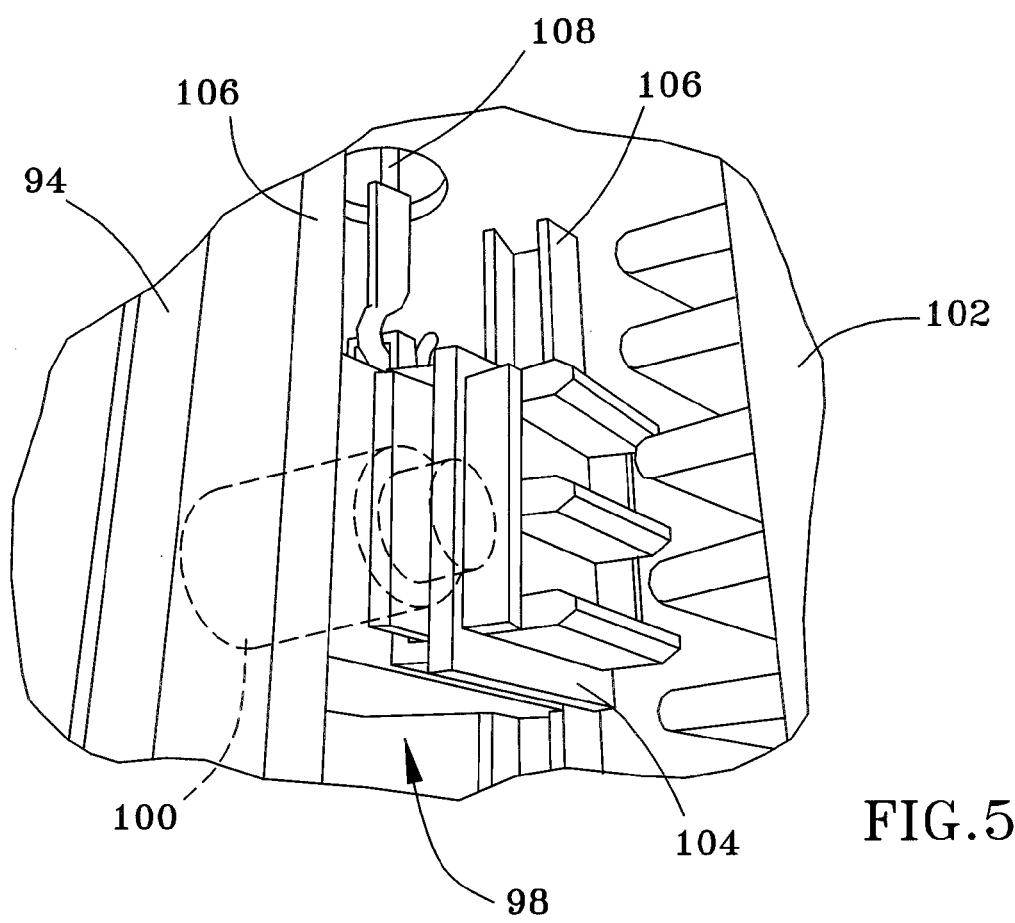
FIG. 5 is a detailed view of a ram and scallop bar adapted for engaging opposite surfaces of the panel of FIG. 3.
Figure 4:
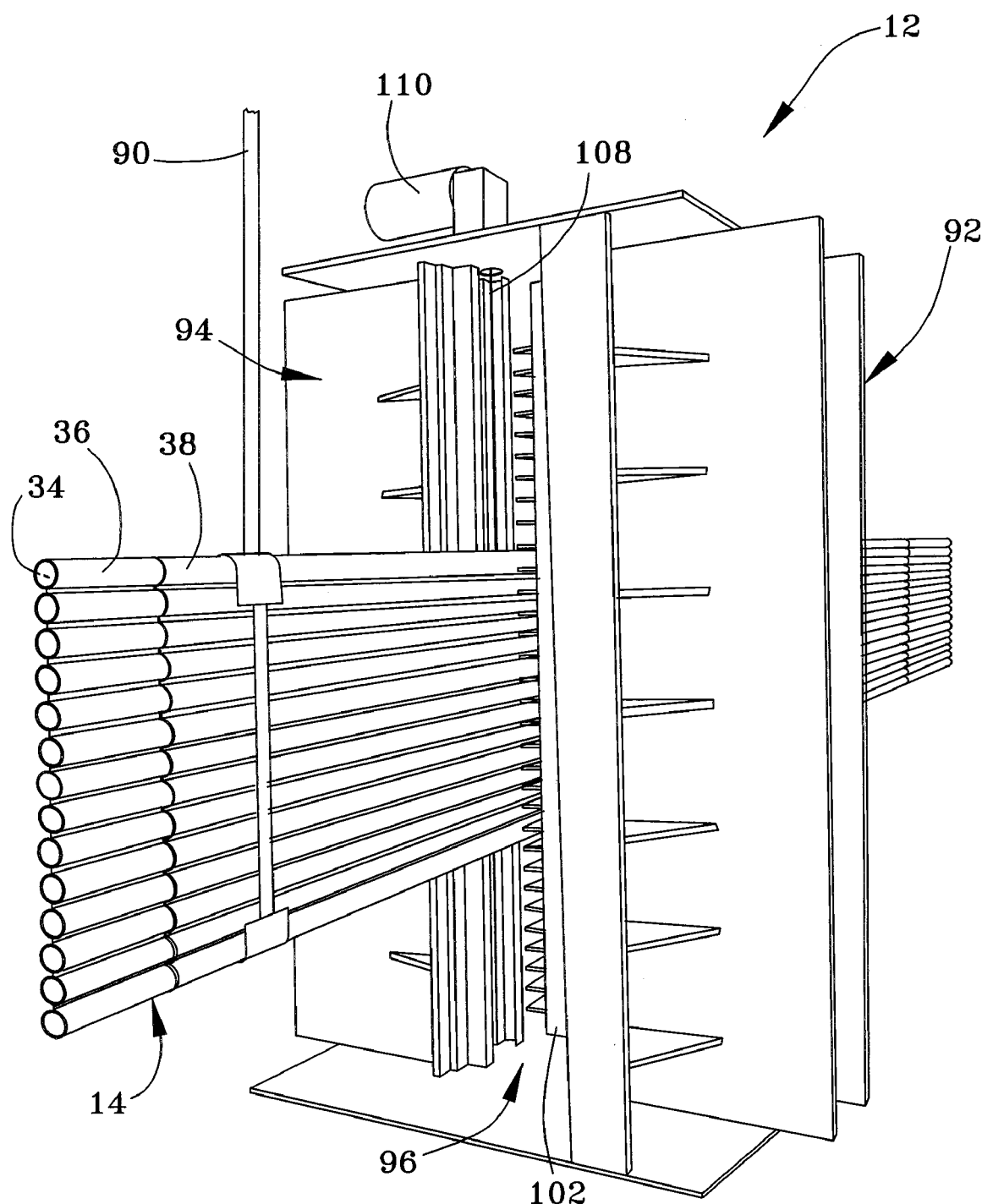
FIG. 4 is a perspective view of a straightening apparatus in accordance with the preferred embodiment of the present invention.

FIGS. 1 and 2 depict an overlay welding apparatus 10 and FIGS. 4 and 5 depict a straightening apparatus 12 in accordance with a preferred embodiment of the invention. As seen in FIGS. 1 and 2, which depict opposite ends of the welding apparatus 10, a boiler tube panel 14 is shown as being horizontally supported on the apparatus 10, with the lower surface 34 of the panel 14 being contacted by an elongate frame 16 and the upper surface 36 of the panel 14 facing upward. The frame 16 is shown as being constructed of individual frame members 22 oriented in a transverse direction to the panel 14 and frame 16, and spaced apart to define slots 24 between adjacent frame members 22. Retaining members 26 are shown as secured to the frame 16 with bolts 28 anchored in the slots 24, enabling the retaining members 26 to be adjusted transversely inward and outward relative to the panel 14 for gripping the lateral edges of the panel 14. The frame 16 further includes a header bar 30 for securing one longitudinal end of the boiler tube panel 14 to the frame 16 and a tail bar 32 for securing the opposite longitudinal end of the panel 14 to the frame 16.

The apparatus 10 is shown as further comprising a track 18 and a pair of welding assemblies 20 mounted to the track 18. Each welding assembly 20 is adapted for depositing an overlay weld 38 on the upper surface 36 of the panel 14. The particulars of the overlay weld 38 will depend in part on the application for the panel 14, including the type of material being welded, and therefore will not be discussed in any detail here. Each overlay weld assembly 20 comprises a welding carriage assembly 40, an index arm 42 extending therefrom, and a welding head or torch 44. The carriage assemblies 40 are mounted to the track 18 and travel along the longitudinal lengths of the panel 14 and frame 16 by a carriage motor 41. The index arms 42 position their respective torch 44 in the lateral direction of the tube panel 14. The torches 44 may be of any suitable metal-arc type, though a gas metal arc welding (GMAW; or metal inert gas (MIG)) torch is preferred that makes use of a wire filler material and shielding gas. A wire feed unit 46 and shielding gas line 48 are shown in FIGS. 1 and 2 for this purpose. The torches 44 are each equipped with a torch height slide 50 for adjusting the distance of the torch 44 from the surface 36 of the panel 14, and an oscillator 52 for causing the torch 44 to oscillate in a direction parallel to the weld bead, i.e., parallel to the travel of the torch 44 relative to the panel 14.

Figure 6:
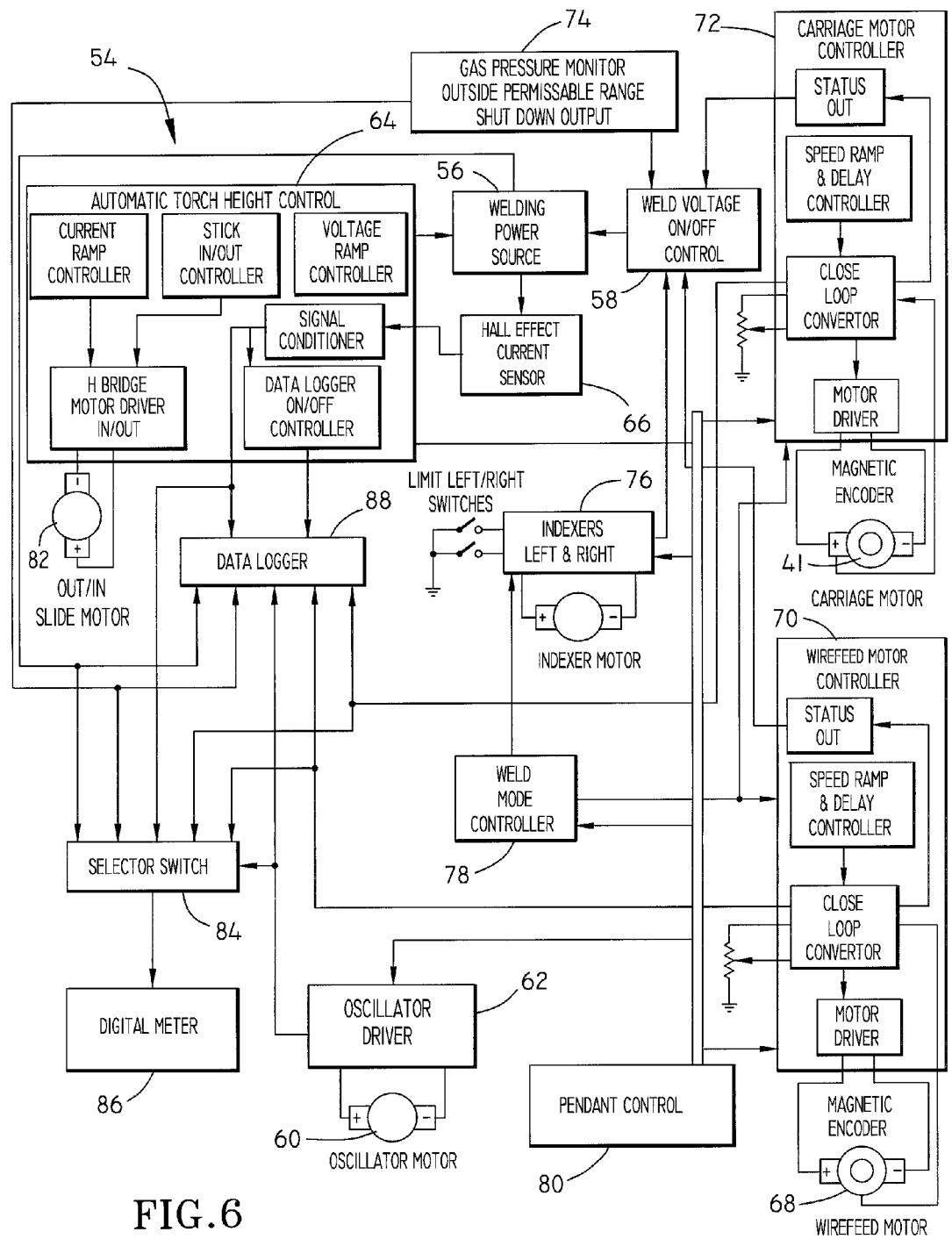
FIG. 6 is a block diagram of a control system for the overlay welding apparatus of FIGS. 1 and 2 in accordance with the preferred embodiment of the present invention.

FIG. 6 is a block diagram of a control system 54 for one of the overlay welding assembly 20. According to a preferred embodiment, the control system 54 corresponds to a control system disclosed in commonly-assigned U.S. Pat. No. 6,548,783 to Kislovsky, whose content pertaining to the control system is incorporated herein by reference. As such, the control system 54 will be summarized below, with more specific details being set forth in Kislovsky.

In accordance with Kislovsky, the control system 54 includes a welding power source 56 that provides the welding current for one of the torches 44. The power source 56 is a pulsed power source preferably capable of delivering direct or alternating current, depending on the welding process, the wire (filler) material, the type of shielding used, and the material of the tube panel. The power source 56 is indicated in FIG. 6 as being controlled by a weld voltage ON/OFF control 58, which enables the welding current to be quickly terminated under certain conditions, as discussed below. As noted above, the welding torch 44 is equipped with an oscillator 52, which in FIG. 6 is shown to be operated by an oscillator motor 60 that is controlled by an oscillator driver 62. The driver 62 preferably utilizes digital potentiometers to regulate the speed of the motor 60, which may be calibrated in strokes per minute. The output of the driver 62 is preferably limited to 0 to 30 VDC at 1.5 amperes.

FIG. 6 further depicts the control system 54 as including a programmable automatic torch height control 64. Through positional feedback from a Hall-effect current sensor 66, the torch height control 64 is able to precisely control the distance between the torch 44 and the adjacent surface 36 of the panel 14 by sensing weld current and controlling the movement of the index arm 42. Alternatively, the torch height controller 64 could make use of a variety of other sensors, such as a temperature sensor or a laser or ultrasound distance sensor. In any event, through feedback the torch height control 64 controls a slide motor 82 mounted to the torch height slide 50 to maintain a constant arc length for its torch 44 as it passes over the contour of the panel 14, thereby maintaining a substantially constant voltage drop.

A wire feed motor 68 feeds wire filler to the overlay welding head 44 at an appropriate speed, which will depend in part on the material, diameter, etc., of the weld wire used. A controller 70 for the wire feed motor 68 preferably utilizes feedback to regulate the wire feed rate to a programmed value, and communicates with the weld voltage ON/OFF control 58. If wire feed speed is below a preset lower limit to the desired speed, an OFF signal is sent to the ON/OFF control 58, which in turn shuts down the welding power source 56.

The control system 54 is also shown as including a closed-loop (feedback) controller 72 for the carriage motor, a monitor 74 for shielding gas pressure, and an indexer motor controller 76. The controller 72 and monitor 74 are preferably programmed to have preset ranges for their respective targets, and communicate with the ON/OFF control 58 so that the control 58 is able to interrupt welding current to the power source 56 for the torch 44 if the carriage motor 41 or shielding gas pressure is outside their permitted ranges. For example, if carriage travel speed falls below a preset lower limit, the carriage motor controller 72 sends an OFF signal to the ON/OFF control 58, which in turn shuts down the welding power source 56 to prevent burn-through. As another example, the shielding gas pressure monitor 74 is preferably operated to continuously monitor shielding gas pressure, which typically will have two preset limits, e.g., a lower 25 psi (about 0.21 MPa) limit and an upper 70 psi (about 0.64 MPa) limit. If the shielding gas pressure is within this range, the weld voltage ON/OFF control 58 is enabled. Audible and visual warnings preferably occur if a gas pressure at the lower or upper limit of the acceptable range is detected. At gas pressures sufficiently outside the permitted range (e.g., 20 psi (about 0.18 MPa)), the ON/OFF control 58 preferably shuts down the power source 56, thereby avoiding a circumstance in which an overlay weld must be removed and a weld repeated because of improper gas pressure.

The indexer motor controller 76 controls an indexer motor to cause the index arm 42, and therefore the welding torch 44 mounted thereto, to move in the transverse direction of the boiler tube panel 14 and frame 16. Potentiometers are provided for adjusting the timing of the index cycle, and a switch for manually changing the direction of indexer travel. The extreme limits for the travel of the welding torch 44 along the weld path are set by limit switches. In a typical welding cycle, the carriage motor 41 causes the welding assembly 20 to travel the length of the track 18 until one of the limit switches is tripped, upon which the indexer motor controller 76 causes the indexer motor to move the index arm 44, and therefore the torch 44, a predetermined distance toward or away from the track 18. After the index sequence, the welding carriage assembly 40 reverses its travel direction on the track 18, such that a bead is formed with some lateral overlap with the immediately preceding bead.

A weld mode controller 78 controls the sequence of events during the welding cycle. An automatic welding cycle can preferably be initiated through a switch on a pendant control 80 that communicates with the weld mode controller 78. The pendant control 80 is preferably suspended to be accessible to an operator standing near the welding apparatus 10, and preferably houses input controls for travel speed of the welding assembly 20 along the frame 16, the electric power source 56, the wirefeed motor controller 70, and the shielding gas monitor 74. Though the welding apparatus 10 is intended for operation in a machine welding cycle, it is foreseeable that the controller 78 could allow for both automatic and manual welding modes.

The control system 54 is also shown as having various input devices, including a selector switch 84, a digital meter 86, and various potentiometers to allow an operator to visually check all parameter settings and adjust them as necessary during the weld overlay process. Finally, the torch height controller 64 is shown as communicating with a data logger 88, which can be controlled, for example, to operate after the welding current from the power source 56 reaches a predetermined level. FIG. 6 also shows the controls 64, 70, and 72, oscillator driver 62, and welding power source 56 as communicating with the data logger 88 for the purpose of monitoring the weld process parameters, enabling evaluation of the weld quality in real time. With such information, an accurate determination can be made of the run time for each operation.

Figure 3:
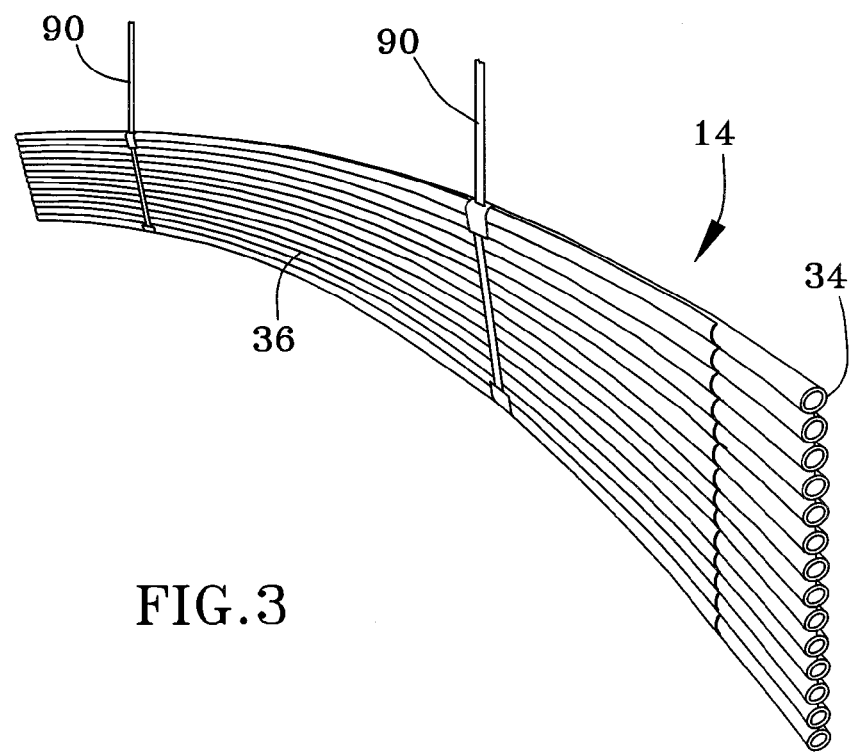
FIG. 3 depicts a boiler tube panel on which an overlay weld was deposited with the apparatus of FIG. 1.

The straightening apparatus 12 depicted in FIGS. 4 and 5 is adapted to straighten the boiler tube panel 14 after it has undergone overlay welding with the welding apparatus 10. A typical post-weld condition of the panel 14 is represented in FIG. 3, evidencing that the lower and upper surfaces 34 and 36 of the panel 14 are convex and concave, respectively. The panel 14 is shown as being transported to and through the straightening apparatus 12 with bands 90 that can be adjustably positioned along the length of the panel 14. The straightening apparatus 12 comprises a frame 92 and a column 94 that is mounted to the frame 92 so as to define a passage 96 through which the panel 14 is fed during the straightening operation. A ram 98 (FIG. 5) is mounted to the column 94 and actuated with a hydraulic cylinder 100 for applying a large force, e.g., nineteen tons (about 9000 N), to the panel 14 when positioned in the passage 96. Mounted to the frame 92 and opposing the ram 98 is a scallop bar 102 for contacting the concave overlaid surface 36 of the panel 14. As seen in FIGS. 4 and 5, the scallop bar 102 is configured complementary to the transverse contour of the panel 14 so that generally uniform pressure is applied to the tubes and membranes of the panel 14. The scallop bar 102 is shown as being longer than the transverse width of the panel 14 so that the entire width of the panel 14 is contacted in a single operation. In contrast, the ram 98 is depicted as carrying an adapter 104 (FIG. 5) that is sized to apply the force generated by the ram 98 to only a limited transverse portion of the convex surface 34 on the panel 14. Similar to the scallop bar 102, the adapter 104 is contoured to be complementary to the contour of the panel 14 as defined by the tubes and membranes of the panel 14. However, the adapter 104 as shown in FIG. 5 is sized to engage only two tubes and their three adjoining membranes. Furthermore, the adapter 104 is narrower in width than the scallop bar 102, so that the adapter 104 will engage the approximate apex of the curvature for that portion of the panel 14 supported by the scallop bar 102 during the straightening process.

To enable straightening of the entire transverse width of the panel 14, the ram 98 is slidably mounted between a pair of tracks 106 on the column 94 and suspended by a cable 108 coupled to a motor 110 that can be operated to raise and lower the ram 98 on the column 94. With this arrangement, straightening can be performed across the width of the panel 14 by sequentially pressing the panel 14 with the adapter 104, releasing the panel 14, repositioning the ram 98 to be aligned with an adjacent transverse portion of the panel 14, and then actuating the ram 98 to apply pressure to the adjacent transverse portion of the panel 14. This operation can be repeated until the entire transverse width of the panel 14 has been straightened, after which the panel 14 is repositioned within the passage 96 to align a new transverse width portion of the panel 14 between the scallop bar 102 and adapter 104.

While the invention has been described in terms of a preferred embodiment, it is apparent that other forms could be adopted by one skilled in the art. Therefore, the scope of the invention is to be limited only by the following claims.

The invention claimed is:

1. An apparatus for depositing an overlay weld on a boiler tube panel comprising a plurality of tubes with adjacent tubes joined together with membranes therebetween, the apparatus comprising:

means for supporting the boiler tube panel during overlay welding thereof, the supporting means comprising a frame adapted to support the boiler tube panel by contacting a first surface thereof, at least one welding carriage mounted adjacent the frame and adapted for travel along the frame, and an overlay welding head mounted to the welding carriage and adapted for depositing an overlay weld on a second surface of the boiler tube panel oppositely disposed from the first surface of the boiler tube panel; and means for straightening the boiler tube panel following deposition of the overlay weld on the second surface of the boiler tube panel, the straightening means comprising a first member having a contact surface with a profile that is complementary to the first surface of the boiler tube panel, a second member having a contact surface with a profile that is complementary to the second surface of the boiler tube panel, means for causing the first and second members to move toward each other to press a portion of the boiler tube panel therebetween and for causing the first and second members to move away from each other to release the boiler tube panel, and means for positioning the boiler tube panel between the first and second members.

2. The apparatus according to claim 1, wherein the frame is horizontal and the boiler tube panel lies on the frame so that the second surface of the boiler tube panel faces upward.

3. The apparatus according to claim 1, wherein the supporting means further comprises a track attached to the frame and oriented parallel to a longitudinal direction of the boiler tube panel on the supporting means, the welding carriage being mounted to the frame for travel along the frame in the longitudinal direction of the boiler tube panel.

4. The apparatus according to claim 3, wherein the welding carriage comprises an arm adapted to move the overlay welding head in a transverse direction of the boiler tube panel.

5. The apparatus according to claim 1, wherein the frame comprises:
a plurality of frame members spaced apart so as to define slots therebetween; and
retaining members having first portions received in the slots and second portions adapted for engaging lateral edges of the boiler tube panel.

6. The apparatus according to claim 5, wherein the retaining members are mounted in the slots for movement in a transverse direction of the boiler tube panel.

7. The apparatus according to claim 1, wherein the supporting means further comprises a header bar and an oppositely-disposed tail bar, the header bar being adapted for securing a first longitudinal end of the boiler tube panel to the frame and the tail bar being adapted for securing an oppositely-disposed second longitudinal end of the boiler tube panel to the frame.

8. The apparatus according to claim 1, further comprising means for providing a feedback signal indicating travel speed of the weld carriage along the frame.

9. The apparatus according to claim 1, further comprising means for delivering a shielding gas to the overlay welding head and means for providing a feedback signal indicating shielding gas pressure.

10. The apparatus according to claim 1, further comprising means for providing a feedback signal indicating distance between the overlay welding head and the second surface of the boiler tube panel.

11. The apparatus according to claim 1, further comprising means for feeding a filler material to the overlay welding head and means for providing a feedback signal indicating the speed at which the filler material is fed to the overlay welding head.

12. The apparatus according to claim 1, wherein the second member is stationary on the straightening means and the first member is movable relative to the second member.

13. The apparatus according to claim 1, wherein the straightening means further comprises means for moving the first member in a direction parallel to the second member.

14. The apparatus according to claim 13, wherein the first member is sized to engage less than the transverse width of the boiler tube panel, and the moving means is operable to cause the first member to travel in the transverse direction of the boiler tube panel.

15. An apparatus for depositing an overlay weld on a boiler tube panel comprising a plurality of tubes with adjacent tubes joined together with membranes therebetween, the apparatus comprising:
means for supporting the boiler tube panel during overlay welding thereof, the supporting means comprising:
an elongate frame sized to accommodate the boiler tube panel and horizontally support the boiler tube panel by contacting a first surface of the boiler tube panel while an oppositely-disposed second surface thereof faces upward;
means for securing oppositely-disposed longitudinal ends and oppositely-disposed transverse edges of the boiler tube panel to the frame;
at least one welding assembly mounted adjacent the frame and adapted for travel along the frame in a longitudinal direction of the boiler tube panel, the welding assembly comprising an arm adapted for movement in a transverse direction of the boiler tube panel; and
an overlay welding head mounted to the arm of the welding assembly and adapted for depositing an overlay weld on the second surface of the boiler tube panel; and
means for straightening the boiler tube panel following deposition of the overlay weld on the second surface of the boiler tube panel, the straightening means comprising:
a stationary member having a contact surface with a profile that is complementary to the second surface of the boiler tube panel, the stationary member being sized to engage substantially all of the transverse width of the boiler tube panel;
a ram member having a contact surface with a profile that is complementary to the first surface of the boiler tube panel, the ram member being sized to engage less than the transverse width of the boiler tube panel;
means for actuating the ram member toward and away from the stationary member in directions normal to the stationary member, the actuating means operating to cause the ram member to move toward the stationary member to press a portion of the boiler tube panel therebetween, and the actuating means operating to cause the ram member to move away from the stationary member to release the boiler tube panel;
means for moving the ram member in a direction parallel to the stationary member and in the transverse direction of the boiler tube panel; and
means for positioning the boiler tube panel between the ram and stationary members.

16. A process for depositing an overlay weld on a boiler tube panel comprising a plurality of tubes with adjacent tubes joined together with membranes therebetween, the process comprising the steps of:
supporting the boiler tube panel and then overlay welding the boiler tube panel, the boiler tube panel being supported on a frame that contacts a first surface of the boiler tube panel, the overlay welding being carried out with at least one overlay welding head supported by a welding carriage traveling along the frame, the overlay welding head depositing an overlay weld on a second surface of the boiler tube panel oppositely disposed from the first surface of the boiler tube panel;
positioning the boiler tube panel between first and second members, the first member having a contact surface with a profile that is complementary to the first surface of the boiler tube panel, the second member having a contact surface with a profile that is complementary to the second surface of the boiler tube panel;
straightening the boiler tube panel by moving the first and second members toward each other so that the first surface of the boiler tube panel is contacted with the contact surface of the first member, the second surface of the boiler tube panel is contacted with the second member, and a portion of the boiler tube panel is pressed therebetween; and then
moving the first and second members away from each other to release the boiler tube panel.

17. The process according to claim 16, wherein the frame is horizontal and the boiler tube panel lies on the frame during the supporting and welding step so that the second surface of the boiler tube panel faces upward.

18. The process according to claim 16, wherein the welding carriage comprises an arm that moves the overlay welding head in a transverse direction of the boiler tube panel during the supporting and welding step.

19. The process according to claim 16, wherein oppositely-disposed longitudinal ends and oppositely-disposed lateral edges of the boiler tube panel are secured to the frame during the supporting and welding step.

20. The process according to claim 16, further comprising the steps of:
providing a feedback signal indicating travel speed of the weld carriage along the frame;
delivering a shielding gas to the overlay welding head;
providing a feedback signal indicating shielding gas pressure;
providing a feedback signal indicating distance between the overlay welding head and the second surface of the boiler tube panel;
feeding a filler material to the overlay welding head; and
providing a feedback signal indicating the speed at which the filler material is fed to the overlay welding head.

21. The process according to claim 16, wherein only the first member is moved during the straightening step.

22. The process according to claim 16, wherein the first member is sized to engage less than the transverse width of the boiler tube panel during the straightening step.

23. The process according to claim 22, wherein during the straightening step the boiler tube panel is released by moving the first and second members away from each other, the first member is moved in a direction parallel to the second member, and then the first and second members are moved toward each other to press a second portion of the boiler tube panel therebetween.

24. The process according to claim 23, wherein the first member travels in the transverse direction of the boiler tube panel when moved parallel to the second member.

25. A process for depositing an overlay weld on a boiler tube panel comprising a plurality of tubes with adjacent tubes joined together with membranes therebetween, the process comprising the steps of:
horizontally supporting the boiler tube panel on an elongate frame that contacts a first surface of the boiler tube panel so that an oppositely-disposed second surface of the boiler tube panel faces upward;
overlay welding the second surface of the boiler tube panel with at least one overlay welding head supported by an arm of a welding carriage, the welding carriage moving the overlay welding head in a longitudinal direction of the boiler tube panel and the arm moving the overlay welding head in a transverse direction of the boiler tube panel;
positioning the boiler tube panel between ram and stationary members, the ram member having a contact surface with a profile that is complementary to the first surface of the boiler tube panel, the stationary member having a contact surface with a profile that is complementary to the second surface of the boiler tube panel, the ram member being sized to engage less than the transverse width of the boiler tube panel, the stationary member being sized to engage substantially all of the transverse width of the boiler tube panel;
straightening a first portion of the boiler tube panel by moving the ram member toward the stationary member so that the first surface of the boiler tube panel is contacted with the contact surface of the ram member, the second surface of the boiler tube panel is contacted with the stationary member, and the first portion is pressed therebetween;
releasing the boiler tube panel by moving the ram member away from the stationary member;
moving the ram member in a direction parallel to the stationary member and transverse to the boiler tube panel;
moving the ram member toward the stationary member to press a second portion of the boiler tube panel therebetween; and then
moving the ram member away from the stationary member to release the boiler tube panel.

* * * * *